US012238079B2

(12) United States Patent
Sharma et al.

(10) Patent No.: US 12,238,079 B2
(45) Date of Patent: Feb. 25, 2025

(54) UPSTREAM APPROACH FOR SECURE CRYPTOGRAPHY KEY DISTRIBUTION AND MANAGEMENT FOR MULTI-SITE DATA CENTERS

(71) Applicant: Cisco Technology, Inc., San Jose, CA (US)

(72) Inventors: Govind Prasad Sharma, Union City, CA (US); Javed Asghar, Dublin, CA (US); Prabhu Balakannan, Milpitas, CA (US); Sridhar Vallepalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/673,183

(22) Filed: May 23, 2024

(65) Prior Publication Data
US 2024/0314114 A1 Sep. 19, 2024

Related U.S. Application Data

(63) Continuation of application No. 18/508,743, filed on Nov. 14, 2023, which is a continuation of application
(Continued)

(51) Int. Cl.
H04L 9/40 (2022.01)
H04L 9/08 (2006.01)
(Continued)

(52) U.S. Cl.
CPC .......... H04L 63/062 (2013.01); H04L 9/0891 (2013.01); H04L 12/4641 (2013.01);
(Continued)

(58) Field of Classification Search
CPC . H04L 9/0891; H04L 63/062; H04L 63/0428; H04L 63/166; H04L 12/4641; H04L 69/14; H04L 69/22
See application file for complete search history.

(56) References Cited

U.S. PATENT DOCUMENTS 8,397,064 B2 3/2013 Khermosh et al.
8,520,595 B2 8/2013 Yadav et al.
(Continued)

FOREIGN PATENT DOCUMENTS

CN 104780069 A 7/2015
CN 105721317 A 6/2016
(Continued)

OTHER PUBLICATIONS

NPL Search Terms (Year: 2024).*
(Continued)

Primary Examiner — Syed A Zaidi
(74) Attorney, Agent, or Firm — Lee & Hayes, P.C.

(57) ABSTRACT

A Software-Defined Networking (SDN)-based "upstream" approach is a controller-based solution that provides secure key distribution and management for multi-site data centers. The approach uses an SDN Multi-Site Controller (MSC) that acts as an intermediary between SDN controllers at sites in a multi-site data center and manages the distribution of keys to sites. The approach is not dependent upon any particular routing protocol, such as the Border Gateway Protocol (BGP), and is well suited for multicast stream encryption by allowing the same key to be used for all replicated packets sent to downstream sites from an upstream source site. The approach distributes keys in a secure manner, ensures that data transferred between sites is done in a secure manner, and supports re-keying with error handling.

20 Claims, 10 Drawing Sheets

Related U.S. Application Data

No. 16/940,114, filed on Jul. 27, 2020, now Pat. No. 11,895,100, which is a continuation of application No. 16/166,973, filed on Oct. 22, 2018, now Pat. No. 10,778,662.

(51) Int. Cl.
*H04L 12/46* (2006.01)
*H04L 69/14* (2022.01)
*H04L 69/22* (2022.01)

(52) U.S. Cl.
CPC ........ *H04L 63/0428* (2013.01); *H04L 63/166* (2013.01); *H04L 69/14* (2013.01); *H04L 69/22* (2013.01)

(56) References Cited

U.S. PATENT DOCUMENTS

| | | | |
|---|---|---|---|
| 8,707,020 | B1 | 4/2014 | Lengyel et al. |
| 8,964,990 | B1 | 2/2015 | Baer et al. |
| 10,021,075 | B1 | 7/2018 | Saad |
| 10,055,601 | B1* | 8/2018 | Hamid .................. H04L 9/0894 |
| 10,397,221 | B2 | 8/2019 | Mohamed et al. |
| 2006/0136715 | A1 | 6/2006 | Han et al. |
| 2007/0133791 | A1 | 6/2007 | Han et al. |
| 2007/0217611 | A1 | 9/2007 | Weis |
| 2008/0130889 | A1 | 6/2008 | Qi et al. |
| 2009/0161874 | A1 | 6/2009 | Eun et al. |
| 2009/0217032 | A1 | 8/2009 | Guan |
| 2009/0307751 | A1 | 12/2009 | Lin et al. |
| 2011/0252231 | A1 | 10/2011 | Mishra |
| 2014/0025945 | A1* | 1/2014 | McGrew ............. H04L 63/0272 713/153 |
| 2014/0226820 | A1 | 8/2014 | Chopra et al. |
| 2015/0030029 | A1 | 1/2015 | Mohamed et al. |
| 2015/0207793 | A1 | 7/2015 | Mohamed et al. |
| 2015/0365409 | A1 | 12/2015 | Mohamed et al. |
| 2016/0036813 | A1 | 2/2016 | Wakumoto et al. |
| 2016/0043996 | A1 | 2/2016 | Syed Mohamed et al. |
| 2016/0218939 | A1 | 7/2016 | Tiwari |
| 2016/0234015 | A1* | 8/2016 | Cabrera .................. H04L 63/00 |
| 2017/0026349 | A1 | 1/2017 | Smith et al. |
| 2017/0026355 | A1 | 1/2017 | Mathaiyan et al. |
| 2017/0026417 | A1 | 1/2017 | Ermagan et al. |
| 2017/0085537 | A1 | 3/2017 | Benedek |
| 2018/0109401 | A1 | 4/2018 | Miyazaki |
| 2018/0115548 | A1 | 4/2018 | Edsall |
| 2018/0139191 | A1* | 5/2018 | Shi ........................ H04L 63/123 |
| 2018/0212895 | A1 | 7/2018 | Szabó et al. |
| 2019/0158279 | A1* | 5/2019 | Chimakurthy ...... H04L 63/0442 |
| 2019/0190910 | A1 | 6/2019 | Min et al. |
| 2020/0127987 | A1 | 4/2020 | Sharma et al. |

FOREIGN PATENT DOCUMENTS

| | | |
|---|---|---|
| CN | 106027555 A | 10/2016 |
| CN | 106656493 A | 5/2017 |
| CN | 107302498 A | 10/2017 |
| CN | 107396350 A | 11/2017 |
| CN | 107710716 A | 2/2018 |
| WO | WO2014120190 A1 | 8/2014 |
| WO | WO2014142985 A1 | 9/2014 |

OTHER PUBLICATIONS

Carnevale, et al., "Marsec-based security for automotive ethernet backbones.", Journal of Circuits, Systems and Computers. May 12, 2018;27 (05):1850082. (Year:2018).

Choi, et al., "MACsec Extension over Software-Defined Networks for In-Vehicle Secure Communication", Tenth International Conference on Ubiquitous and Future Networks, Jul. 2018, IEEE, pp. 180-185.

Chinese Office Action mailed Oct. 10, 2022 for Chinese Patent Application No. 201980069131.6, a foreign counterpart to U.S. Pat. No. 10,778,662, 7 pages.

IEEE: "Draft Standard for Local and Metropolitan Area Networks-Media Access Control (MAC) Security LAN MAN Standards Committee if the IEEE Computer Society", Retrieved from the Internet: URL:https://ieeecplore.ieee.org/stampPDF/getPDF.jsp?tp=&arnumber=4039808&ref= , retreived on Dec. 5, 2019, Jan. 19, 2006, pp. 13-15, 3.Specifications, pp. 30, 7.1 Support of the secure MAC Service by an individual LAN, p. 35, Figures 7-7, pp. 44, 8.2.7 Key exchange and, maintenance, pp. 45, 8.3 MACsec operation, pp. 49, 9.6 Assoc No.

NPL Search Results (Year:2020).

NPL Search Terms (Year 2023), 1 pg.

Office Action for U.S. Appl. No. 16/940,114, mailed on Jan. 3, 2023, Sharma, "Upstream Approach for Secure Cryptography Key Distribution and Management for Multi-Site Data Centers", 11 pages.

Office Action for U.S. Appl. No. 16/940,114, mailed on Jun. 22, 2023, Sharma, "Upstream Approach for Secure Cryptography Key Distribution and Management for Multi-Site Data Centers", 13 Pages.

Search Report mailed on Dec. 17, 2019, for PCT Application No. PCT/US2019/054967, 16 pages.

Pre-Filing Search Report, "Son Controller Based Upstream Cryptography Key Allocation and Distribution Model" dated Mar. 26, 2018, 13 pages.

Weiss, "Security considerations and proposal for MACsec key establishment" May 2006, pp. 1-18.

Zhang, et al., "Enhancing Security and Scalability in Software Defined LTE Core Networks", 2018 17th IEEE International Conference On Trust, Security And Privacy In Computing And Communications/ 12th IEEE International Conference On Big Data Science And Engineering, IEEE, Aug. 2018, pp. 837-842.

* cited by examiner

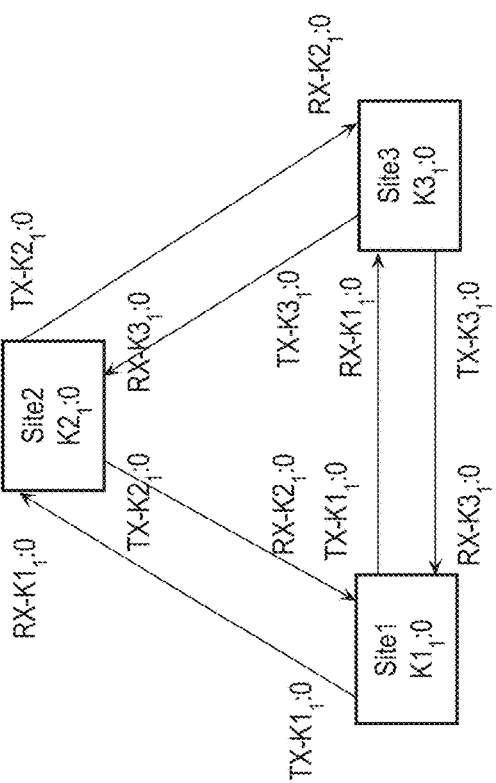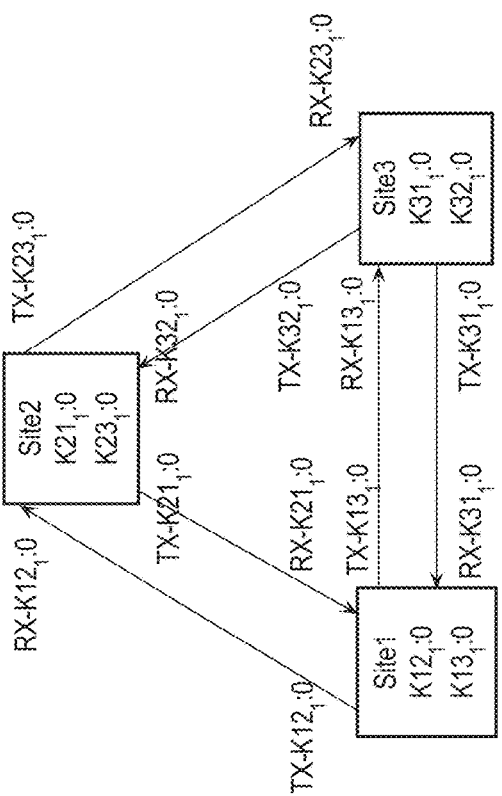

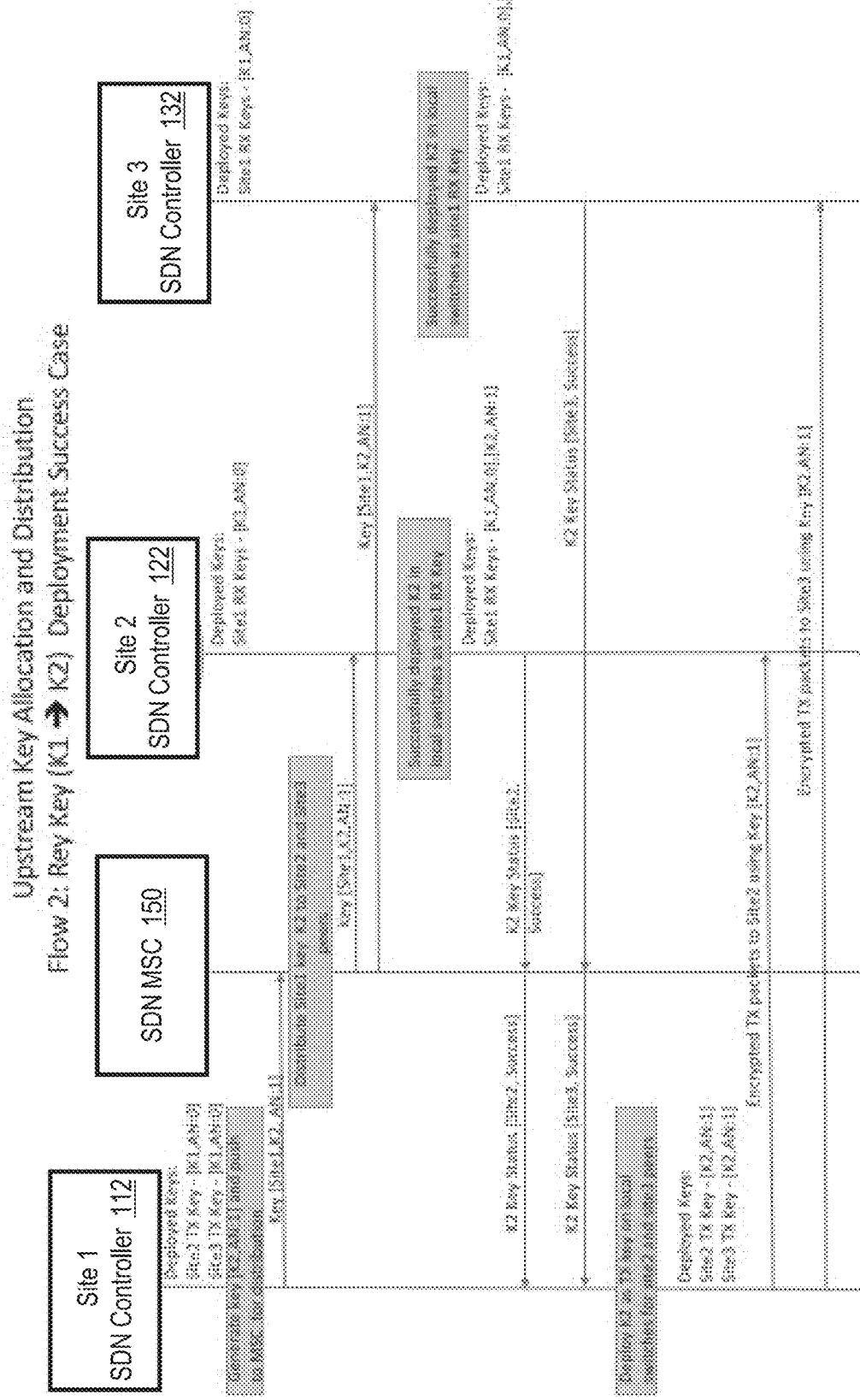

UPSTREAM APPROACH FOR SECURE CRYPTOGRAPHY KEY DISTRIBUTION AND MANAGEMENT FOR MULTI-SITE DATA CENTERS

RELATED APPLICATIONS

This application claims priority to and is a continuation of U.S. patent application Ser. No. 18/508,743, filed on Nov. 14, 2023, which claims priority to and is a continuation of U.S. patent application Ser. No. 16/940,114, filed on Jul. 27, 2020, which claims priority to and is a continuation of U.S. patent application Ser. No. 16/166,973, filed on Oct. 22, 2018, the entire contents of which are incorporated herein by reference.

FIELD

Embodiments relate generally to multi-site data centers, and more specifically, to an approach for cryptographic key, also referred to herein as "key", distribution and management for multi-site data centers.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many data centers are now implemented across multiple sites to address IP mobility, disaster recovery, scaling, and redundancy concerns. Some sites are being implemented using non-blocking switch architectures, such as Clos networks. With Clos network topology, each site typically includes spine switches connected to a larger number of leaf switches, with each leaf switch being connected to physical servers that each host virtual servers/endpoints. As one example, a site may be comprised of one or more PODs, where each POD includes approximately 8-16 spine switches that are connected to approximately 500-1000 leaf switches. With each physical server hosting approximately 20 virtual servers, each leaf switch is connected to approximately 1000-2000 virtual servers/endpoints. The sites are connected using a data center interconnect (DCI) strategy, such as Virtual Extensible Local Area Network (VXLAN), which creates a Layer 2 logical network on top of Layer 3 using encapsulation to support traffic between the sites.

One of the issues with multi-site data centers is how to secure communications between sites. Existing key distribution and management mechanisms, such as the IEEE's Media Access Control Security (MACsec) standard, are control plane-based and only suitable for devices deployed in a Layer 2 network. They are not well suited for providing key distribution and management for multi-site data centers that use Layer 3 networks to provide communication between sites.

BRIEF DESCRIPTION OF THE DRAWINGS

In the figures of the accompanying drawings like reference numerals refer to similar elements.

FIG. 3A depicts a key diagram of transmit and receive keys used to exchange data between sites in a multi-site data center in the context of a single transmit encryption key.

FIG. 3B depicts a key table of transmit and receive keys used to exchange data between sites in a multi-site data center in the context of a single transmit encryption key.

FIG. 4A depicts a key diagram of transmit and receive keys used to exchange data between sites in a multi-site data center in the context of multiple transmit encryption keys.

FIG. 4B depicts a key table of transmit and receive keys used to exchange data between sites in a multi-site data center in the context of multiple transmit encryption keys.

FIG. 5B depicts a successful re-keying of key K1 to key K2.

DETAILED DESCRIPTION

In the following description, for the purposes of explanation, numerous specific details are set forth in order to provide a thorough understanding of the various embodiments. It will be apparent, however, to one skilled in the art that the embodiments may be practiced without these specific details. In other instances, well-known structures and devices are shown in block diagram form to avoid unnecessarily obscuring the embodiments. Various aspects of embodiments are described hereinafter in the following sections:

I. Overview
II. Architecture
III. Upstream Key Allocation and Distribution
IV. Re-Keying
V. Security and Other Considerations
VI. Example Use Cases
VII. Implementation Examples

I. Overview

A Software-Defined Networking (SDN)-based "upstream" approach is a controller-based solution that provides secure key distribution and management for multi-site data centers. The approach uses an SDN Multi-Site Controller (MSC) that acts as an intermediary between SDN controllers at sites in a multi-site data center and manages the distribution of keys to sites. The approach is not dependent upon any particular routing protocol, such as the Border Gateway Protocol (BGP), and is well suited for multicast, in addition to unicast, stream encryption by allowing the same key to be used for all replicated packets sent to downstream sites from an upstream source site. The approach distributes keys in a secure manner, ensures that data transferred between sites is done in a secure manner, and supports re-keying with error handling. The approach requires fewer computational and storage resources than "downstream"

approaches that require a different key for each replicated packet sent to downstream sites. In addition, the approach is simpler to implement and understand for users and provides better packet-level traceability and troubleshooting compared to "downstream" approaches.

II. Architecture

Figure 1:
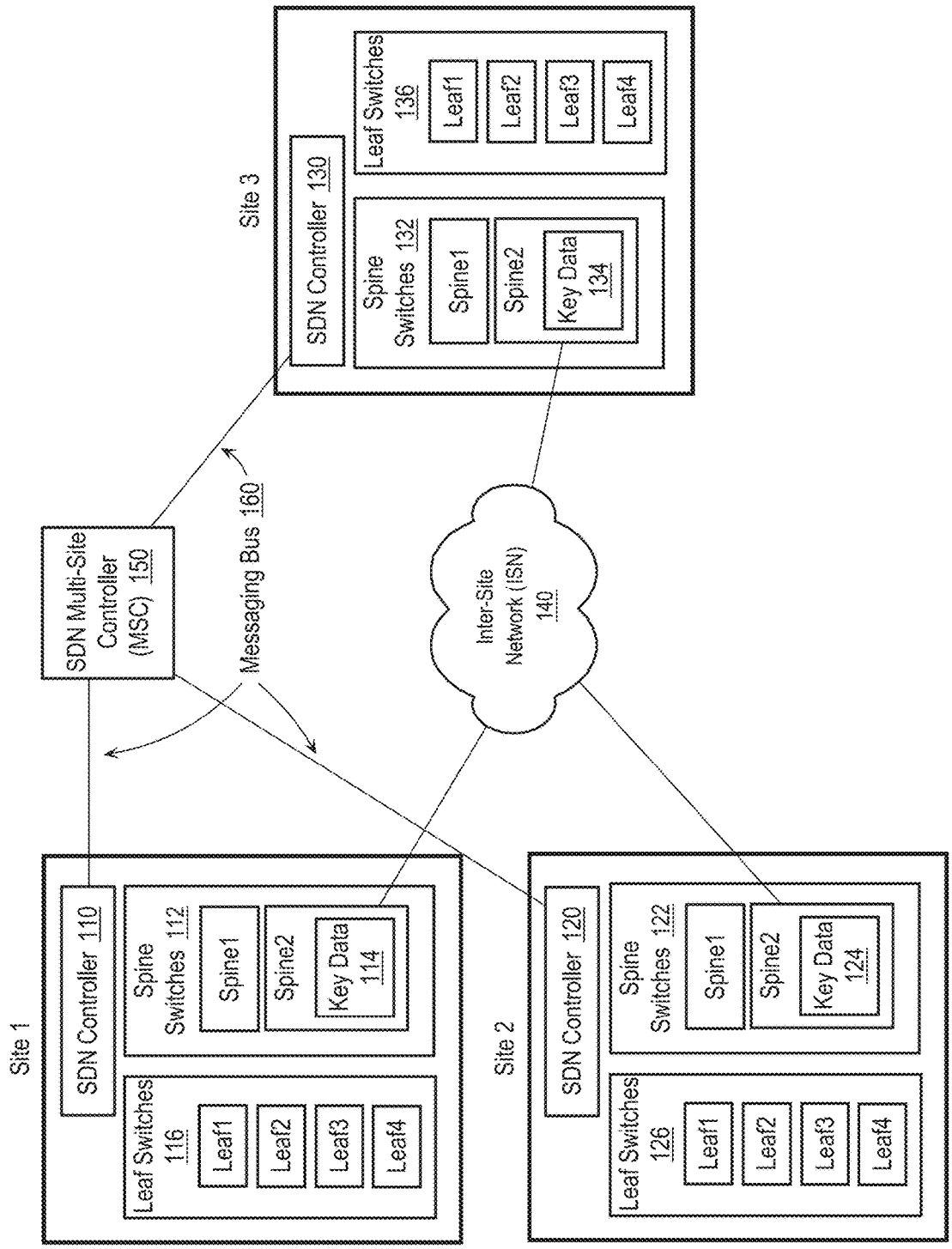
FIG. 1 depicts an example arrangement for providing secure key distribution and management for multi-site data centers.

FIG. 1 depicts an example arrangement 100 for providing secure key distribution and management for multi-site data centers. Arrangement 100 includes three sites, sometimes also referred to as "pods," identified in FIG. 1 as Site 1, Site 2, and Site 3, communicatively coupled via an Inter-Site Network (ISN) 140. Each site includes an SDN controller 110, 120, 130, spine switches, 112, 122, 132, and leaf switches 116, 126, 136, respectively. SDN controllers 110, 120, 130, also known as Application Policy Infrastructure Controllers (APICs), monitor and manage the operations of data center fabric at their respective sites and may be implemented in hardware, computer software, or any combination of hardware and computer software. As described in more detail hereinafter, SDN controllers 110, 120, 130 are configured with the capability to generate Security Association Keys (SAKs), also referred to hereinafter as "keys," used in the Cloudsec data plane to encrypt and decrypt data transmitted between sites. In addition, although SDN controllers 110, 120, 130 are depicted in the figures and described herein in the context of a single SDN controller, this is done for purposes of explanation and embodiments are not limited to this example and are applicable to SDN controllers 110, 120, 130 being implemented as SDN controller clusters with multiple SDN controllers. Spine switches 112, 122, 132 and leaf switches 116, 126, 136 may be implemented by any type of network switch and embodiments are not limited to any particular type of network switch. According to an embodiment, spine switch Spine 2 in spine switches 112, 122, 132 each includes key data 114, 124, 134, respectively, that may include keys used to encrypt and/or decrypt packets transmitted and/or received over ISN 140. Key data 114, 124, 134 may include other information used by spine switches to select a particular key to decrypt encrypted data, as described in more detail hereinafter.

Each site may include other elements, including hardware elements, software elements, and any combination of hardware elements and software elements that may vary depending upon a particular implementation. For example, each site may include hardware servers connected to the respective leaf switches, and each hardware server may host multiple virtual servers/endpoints that are not depicted in FIG. 1 for brevity. ISN 140 is an external public network that provides connectivity between sites in a multi-site data center. ISN 140 may be implemented using any type of DCI strategy, such as VXLAN, to support traffic between the sites.

Arrangement 100 also includes an SDN Multi-Site Controller (MSC) 150 that is an SDN controller that connects SDN controllers 110, 120, 130 in a management plane and monitors and manages inter-site configurations and operations. According to an embodiment, this includes distributing and managing keys among sites of a multi-site data center to enable the implementation of Cisco's Cloudsec encryption for DCI-enabled devices that communicate over Layer 3 public networks in the cloud, which uses IEEE MACsec for UDP packets, especially VXLAN packets. SDN MSC 150 may be implemented in hardware, computer software, or any combination of hardware and computer software. According to an embodiment, SDN MSC 150 communicates with SDN controllers 110, 120, 130 via a messaging bus 160 that may be implemented, for example, using Transport Layer Security (TLS). Embodiments are not limited to using TLS or TCP/IP networks however, and any type of secure messaging mechanism may be used. According to an embodiment, SDN controllers 110, 120, 130 and SDN MSC 150 each support a REpresentational State Transfer (REST) Application Program Interface (API) that may be integrated with Application Centric Infrastructure (ACI)-based and non ACI-based cloud SDN controllers used in data centers.

III. Upstream Key Allocation and Distribution

Figure 2A:
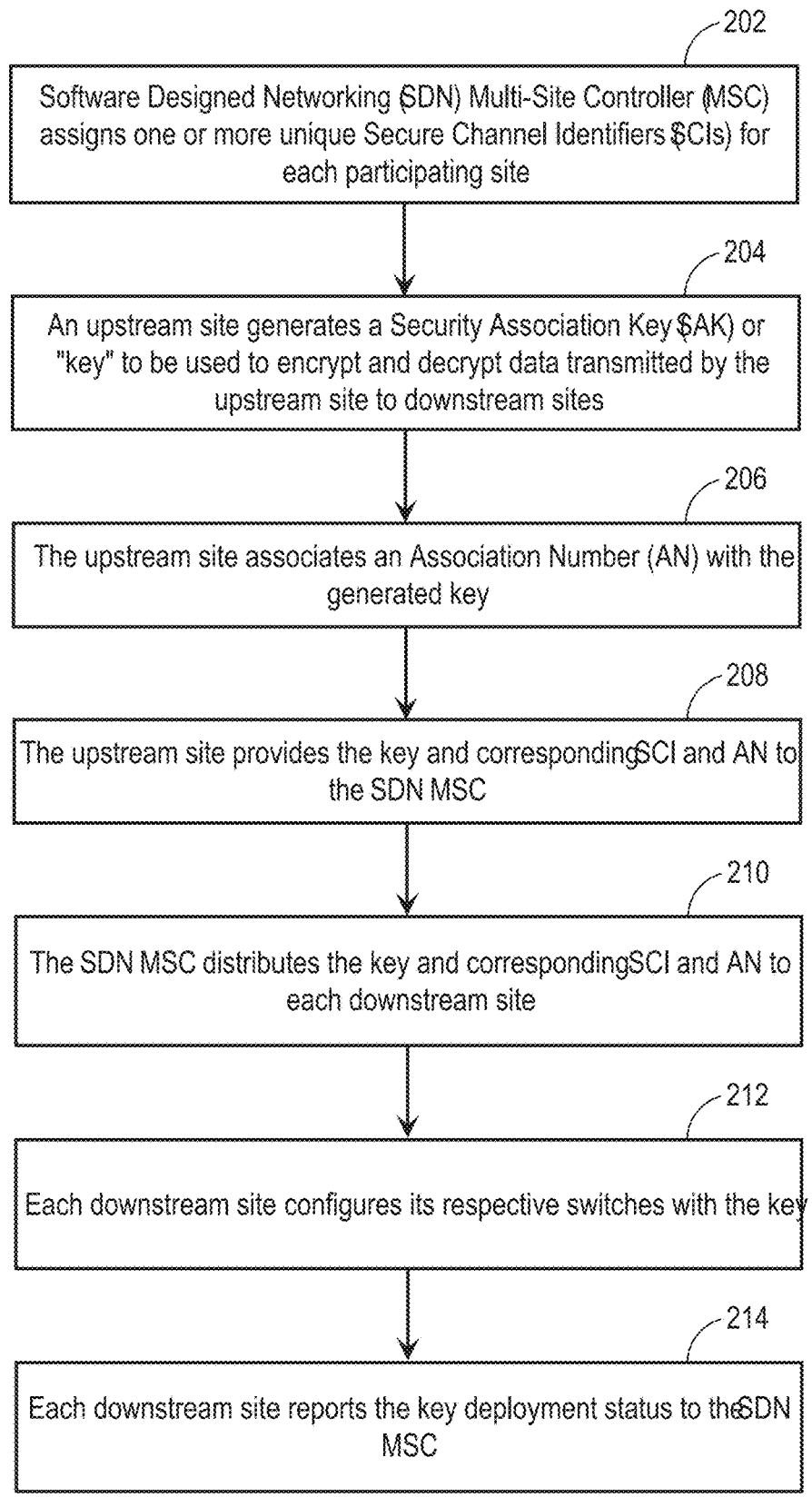
FIGS. 2A and 2B comprise a flow diagram that depicts an upstream key allocation and distribution approach.
Figure 2B:
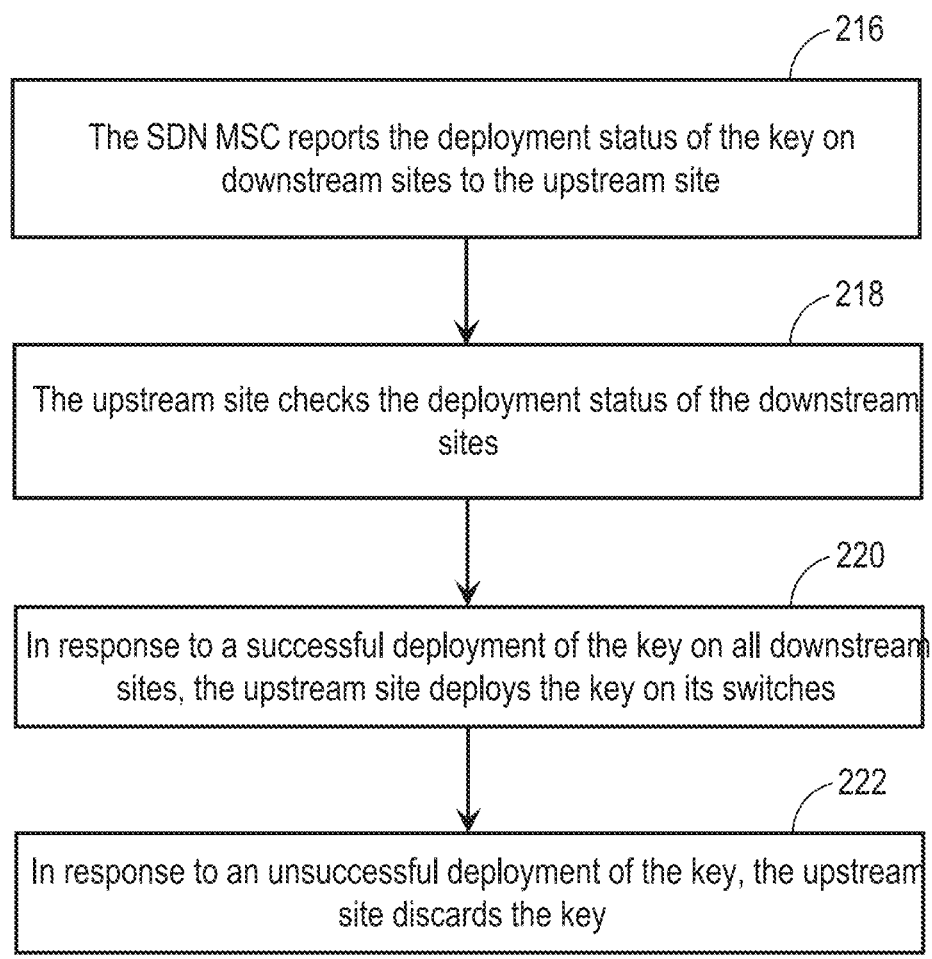

According to an embodiment, upstream key allocation is implemented by SDN MSC 150 in conjunction with SDN controllers 110, 120, 130. FIGS. 2A and 2B comprise a flow diagram 200 that depicts an upstream key allocation and distribution approach according to an embodiment. In step 202, SDN MSC 150 assigns one or more unique Secure Channel Identifiers (SCIs) for each participating Cloudsec-enabled site, e.g., Site 1, Site 2, and Site 3 of FIG. 1. An SCI is a unique identifier for a unidirectional secure association channel established in the data plane between participating Cloudsec devices that share the same cryptography attributes, where a SAK is used to encrypt and decrypt network traffic. Not all sites in a multi-site data center may necessarily communicate with other sites in the multi-site data center, and SCIs do not need to be assigned to non-participating sites, or sites that are not Cloudsec-enabled. SDN MSC 150 may assign a single SCI to a particular site if a single secure channel is to be used for encrypted communications between the particular site and all other participating Cloudsec-enabled sites in the multi-site data center. Alternatively, SDN MSC 150 may assign multiple SCIs to a particular site if multiple secure channels will be used for encrypted communications between the particular site and other participating Cloudsec-enabled sites in the multi-site data center. SDN MSC 150 may store the SCIs for each site locally, for example, in a table maintained by SDN MSC 150.

In step 204, a site, referred to hereinafter as the "upstream site," generates a local symmetric key to be used to encrypt VXLAN packet payloads transmitted by the upstream site. This key is also used by receiving sites, referred to hereinafter as the "downstream sites," to decrypt the encrypted packets. For example, SDN controller 110 generates a key to be used to encrypt packets transmitted by Site 1 to Site 2 and Site 3 via ISN 140. This key is also used by Site 2 and Site 3 to decrypt encrypted packets received from Site 1 via ISN 140.

In step 206, the upstream site associates an Association Number (AN) with the generated key. An AN is a unique identifier of a SAK within a security association channel. For example, SDN controller 110 associates an AN with the generated key. The AN is inserted by the upstream device at the upstream site into the Cloudsec (MACsec) header of encrypted packets and as described in more detail hereinafter, is used by downstream devices at downstream sites to determine, in association with the SCI, the correct key to decrypt encrypted packets. According to one embodiment, an AN has a value of 0 or 1, and ANs may be reused when a key is no longer in use. The use of an AN in this manner allows each downstream device to maintain two deployed keys for each SCI and select the correct key to decrypt an encrypted VXLAN payload based upon the AN value, in combination with the SCI, stored in the MACsec header of a received packet. For example, key data 114, 124, 134 may include a table, where each row of the table specifies a key for a particular combination of SCI and AN. According to the approach described herein, the table may include two keys for each SCI, where one of the keys corresponds to AN=0 and the other key corresponds to AN=1.

In step 208, the upstream site provides the key and the corresponding SCI and AN to SDN MSC 150. For example, SDN controller 110 provides the key and the corresponding SCI issued by SDN MSC 150 and the associated AN to SDN MSC 150. Alternatively, if only a single SCI has been assigned to Site 1, because Site 1 will use a single secure channel with all other sites, then SDN controller 110 may provide only the key and the associated AN to SDN MSC 150, and SDN MSC 150 can derive the SCI based upon the communication from SDN controller 110. SDN MSC 150 may store the key and corresponding SCI and AN in association with Site 1. For example, SDN MSC 150 may add the key and AN to the row of the table that corresponds to the SCI issued to Site 1 by SDN MSC 150.

In step 210, SDN MSC 150 distributes the key and corresponding SCI and AN to each downstream site. In the present example, SDN MSC 150 distributes the key and corresponding SCI and AN to Site 2 and Site 3 via SDN controllers 120, 130, respectively.

In step 212, each downstream site configures its respective switches with the key. This only needs to be performed for the switches that will be receiving encrypted data from the transmitting site. For example, SDN controller 120 programs spine switch Spine 2 in spine switches 122 to use the key to decrypt encrypted packets that both are received on the secure channel that corresponds to the SCI and have the AN in the Cloudsec header. As described in more detail hereinafter, the use of the AN allows a current key to be retained and continue to be used for Cloudsec encryption of packets transmitted between sites in a multi-site data center when the deployment of a replacement key was not successful.

In step 214, each downstream site reports the deployment status of the key on its local switches. For example, SDN controller 120 reports to SDN MSC 150 the status of the deployment of the key to spine switch Spine 2. The deployment status may indicate, for example, the status of the key deployment and a success or failure. In the present example, SDN controller 130 also reports the deployment status of the key on Site 3, and more specifically on spine switch Spine 2, to SDN MSC 150. SDN MSC 150 may use timeouts to determine that deployment of the key was not successful if a deployment status message is not received within a specified amount of time. For example, if SDN MSC 150 does not receive a deployment status message from Site 3 within a specified amount of time, for example because of an error on Site 3, a communications error, etc., SDN MSC 150 may determine that deployment of the key on Site 3 was unsuccessful.

In step 216, SDN MSC 150 provides the key deployment status of the downstream sites to the upstream site. For example, SDN MSC 150 reports to SDN controller 110 the deployment status of the key on Site 2 and Site 3. This may be accomplished using a single message or a separate message for each downstream site. For example, SDN MSC 150 may wait until a deployment response has been received from each downstream site before reporting the deployment result to the upstream site. The number of deployment failures is not important since the failure to deploy the key on even a single downstream site means that the key cannot be used.

In step 218, the upstream site checks the deployment status of the downstream sites to determine whether the key can be used. In the case where a separate deployment status message is sent by SDN MSC 150 for each downstream site, then the upstream site waits until a deployment status message has been received for each downstream site.

In step 220, in response to a successful deployment of the key on all of the downstream sites, the upstream site deploys the key on its switches to encrypt packets transmitted by the upstream site on the secure channel. For example, SDN controller 110 programs spine switch Spine 2 to use the key to encrypt VXLAN packet payloads transmitted by spine switch Spine 2 on the secure channel.

In step 222, in response to an unsuccessful deployment of the key on the downstream sites, the upstream site discards the key. If the key is the first key deployed by the upstream site, then the upstream site may take different actions depending upon a "secure mode" configuration. For example, for a "must secure" mode, the upstream site may discard packets until a key can be successfully deployed on all of the downstream sites. Alternatively, for a "should secure" mode, packets may be transmitted to the downstream sites without encryption. If the key is not the first key deployed by the upstream site, then the upstream site may continue to use the current key.

FIG. 3A depicts a key diagram of transmit and receive keys used to exchange data between Site 1, Site 2, and Site 3 in the context of a single transmit encryption key per site, using the approach described herein. The labels are expressed in the form of: <Key Type>-<Key ID>:AN, where TX refers to a transmit or encryption key, and RX refers to a receive or decryption key. Note that in the single transmit key context, one key is used to encrypt data transmitted by a site, regardless of the downstream site. FIG. 3B depicts a key table of transmit and receive keys used to exchange data between Site 1, Site 2, and Site 3 in the context of a single transmit encryption key per site.

FIG. 4A depicts a key table depicts transmit and receive keys used to exchange data between Site 1, Site 2, and Site 3 in the context of a multiple transmit encryption keys per site, using the approach described herein. Note that in the multiple encryption key context, a different key is used to encrypt data transmitted by a site, depending upon the downstream site, i.e., for each combination of upstream and downstream sites. FIG. 4B depicts a key table of transmit and receive keys used to exchange data between Site 1, Site 2, and Site 3 in the context of multiple transmit encryption keys per site. The examples depicted in FIGS. 3A, 3B, 4A, and 4B may be extended to implementations with any number of sites.

IV. Re-Keying

The approach described above for creating and distributing a new key is applicable to re-keying scenarios. Re-keying, i.e., replacing a current encryption key with a new encryption key, may be performed, for example, prior to or after expiration of a current key, in response to third party attacks, in accordance with various security policies, etc. As in the new key scenario described above, when an upstream site creates a new key to replace an existing key, the new key is not used by the upstream site to encrypt packets until confirmation is received from SDN MSC 150 that the new key has been successfully deployed on all participating sites. If the new key is not successfully deployed on any of the participating sites, then the new key is not used, and may be discarded, and the existing key continues to be used.

According to an embodiment, when a new key is successfully deployed on downstream sites and is being used by an upstream site to encrypt packets, the downstream sites keep the old key for a specified amount of time. For example, SDN controllers 110, 120, 130 may keep the old key in key data 114, 124, 134, respectively, for the specified amount of time. This ensures that out-of-order packets that are encrypted with the old key can be decrypted by the downstream sites, even if the encrypted packets are received after the replacement key is in use. The specified amount of time may be obtained from a policy and/or configured, for example, by an administrative user. In addition, according to an embodiment, an upstream site will not re-use an AN associated with an older working key in the security channel unless the new key has been successfully deployed at all of the downstream sites in the secure channel.

V. Security and Other Considerations

As previously described herein, data may be securely exchanged between the sites, Site 1, Site 2, Site 3, and SDN MSC 150 over messaging bus 160 using TLS. This includes keys, SCIs, ANs, and deployment status information. According to an embodiment, a Key Encryption Key (KEK), as used in MACsec key management, is used to encrypt SAKs, i.e., keys, exchanged between sites to provide additional security. A KEK may be configured at SDN MSC 150 and distributed to SDN controllers 110, 120, 130. Although embodiments are depicted in the figures and described herein in the context of ACI inter-site security in data centers, embodiments are not limited to this context and are applicable to non-ACI cloud deployments for other types of IP traffic streams.

In cloud deployments, the approaches described herein provide many benefits over device level control plane solutions, such as piggybacking over BGP, or similar, that use a different encryption key for each downstream site. Such approaches have a different MACsec header for each downstream site, whereas with the approach described herein, the same encryption key and MACsec header may be used in each copy of packets transmitted to different downstream sites, making it well suited for multicast applications. Using an upstream site's allocated encryption key and MACsec header for tagging and encryption provides better traceability of packets from source to destination and provides easier troubleshooting. The SDN controller-based approach described herein is also easier to implement.

VI. Example Use Cases

Figure 5A:
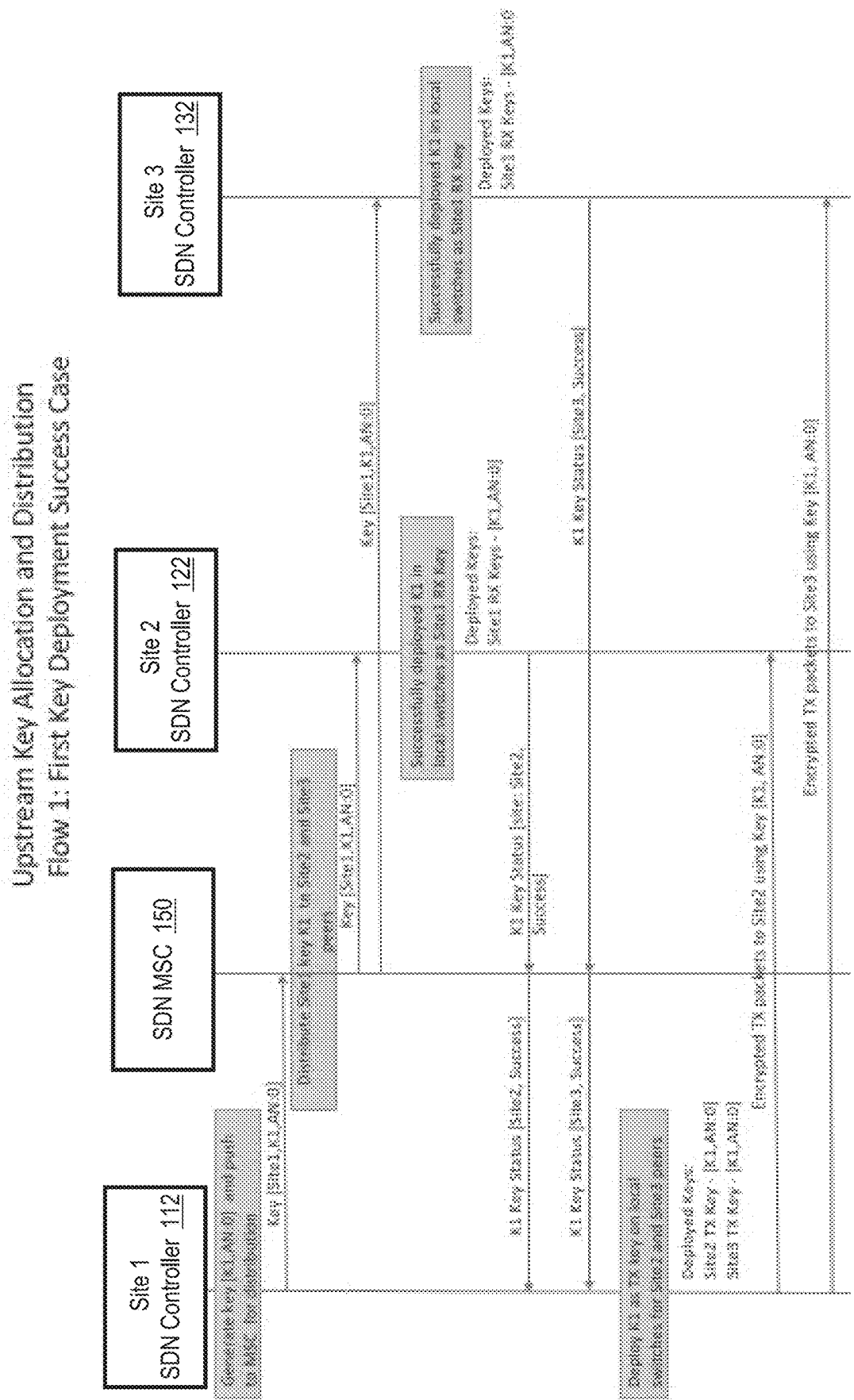
FIG. 5A depicts a successful deployment of a single key K1 with AN=0 from Site 1 to Site 2 and Site 3 by SDN MSC 150.

FIGS. 5A-5E depict example use cases for the approach described herein for providing secure key distribution and management for multi-site data centers. The use cases show the data and messages exchanged between Site 1, Site 2, Site 3, and SDN MSC 150. FIG. 5A depicts a successful deployment of a single key K1 with AN=0 from Site 1 to Site 2 and Site 3 by SDN MSC 150. Key K1 is generated by Site 1 and provided with the AN to SDN MSC 150, which distributes the key K1 and AN to Site 2 and Site 3. After confirmation is received by Site 1, via SDN MSC 150, that the key K1 was successfully deployed on both Site 2 and Site 3, Site 1 deploys the key K1 on its local switches, e.g., spine switch Spine 2. VXLAN packet payloads are encrypted by spine switch Spine 2 using key K1 and the SCI and AN are included in the MACsec header to allow the downstream devices at Site 2 and Site 3 to derive the correct decryption key for decrypting the encrypted VXLAN packet payloads.

FIG. 5B depicts a successful re-keying of key K1 to key K2. As previously described herein, re-keying may occur for a wide variety of reasons, such as prior to or after expiration of a current key, in response to third party attacks, in accordance with various security policies, etc. Note that in FIG. 5B, after the successful deployment of key K2, both Site 2 and Site 3 have two deployed keys: key K1, with AN=0; and key K2, with AN=1. Although key K2 will be used by the upstream device at Site 1 to encrypt subsequent VXLAN packet payloads key K1 is still available to the downstream devices at Site 2 and Site 3 to decrypt out-of-order packets that were encrypted using key K1. In addition, key K1 remains available in the event that the deployment of key K2 is not successful, and packets continue to be encrypted by the upstream device at Site 1 using key K1.

Figure 5C:
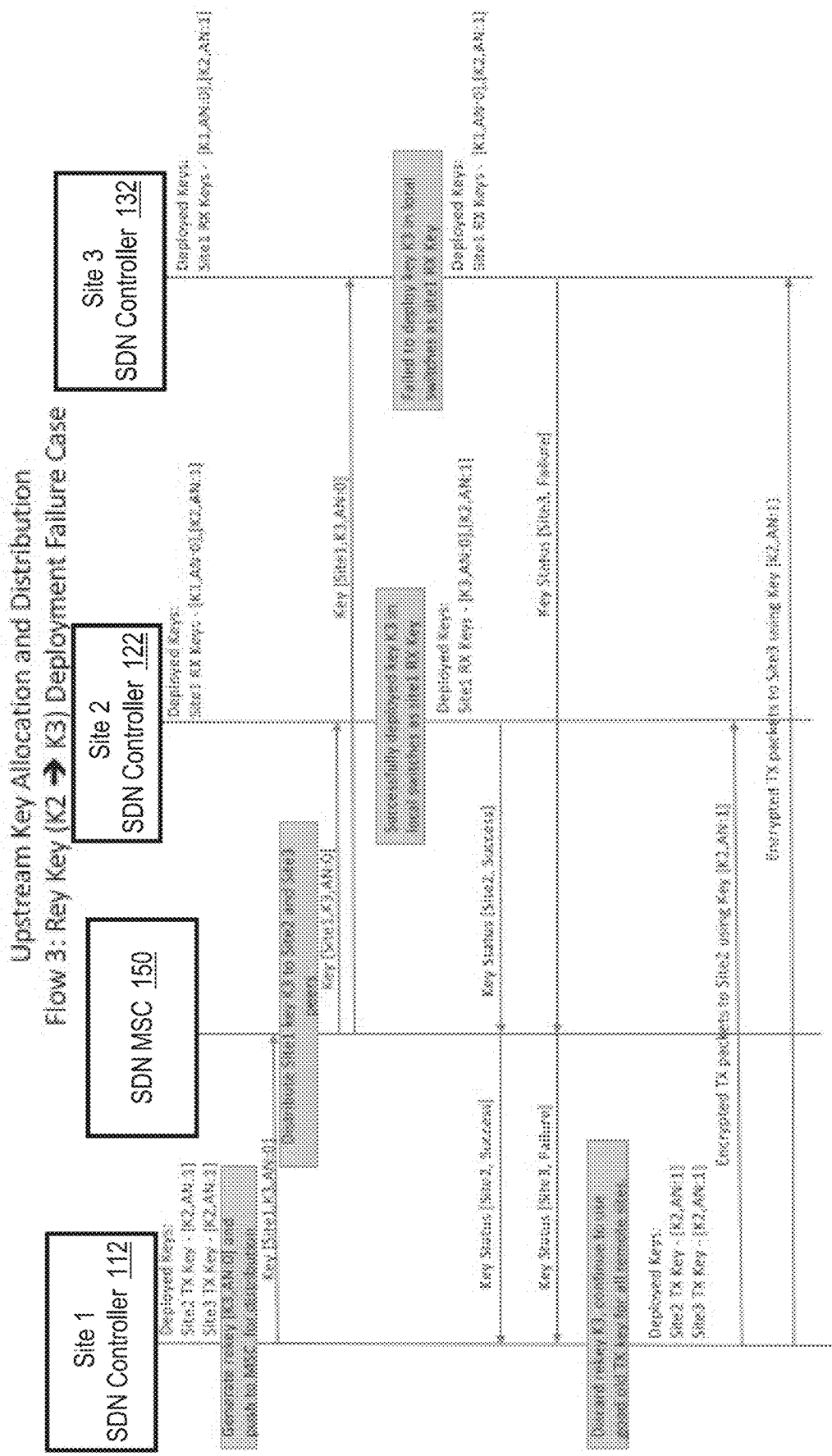
FIG. 5C depicts the unsuccessful re-keying of key K2 to key K3 because of a failure at Site 3 that prevented the deployment of the new key K3.

FIG. 5C depicts the unsuccessful re-keying of key K2 to key K3 because of a failure at Site 3 that prevented the deployment of the new key K3. In this example, Site 1 is using key K2 to encrypt packets sent to Site 2 and Site 3 and attempts to deploy new key K3, with AN=0 to Site 2 and Site 3. After the attempted deployment, and the error on Site 3 in deploying the new key K3, both Site 2 and Site 3 have two deployed keys, but the keys are different because the deployment of new key K3 to Site 2 was successful. Site 2 has key K3, with AN=0, and key K2, with AN=1, while Site 3 has key K1, with AN=0, and key K2, with AN=1. After the failure of Site 3 to deploy the new key K3, Site 1 continues to use key K2 to encrypt packets sent to both Site 2 and Site 3.

Figure 5D:
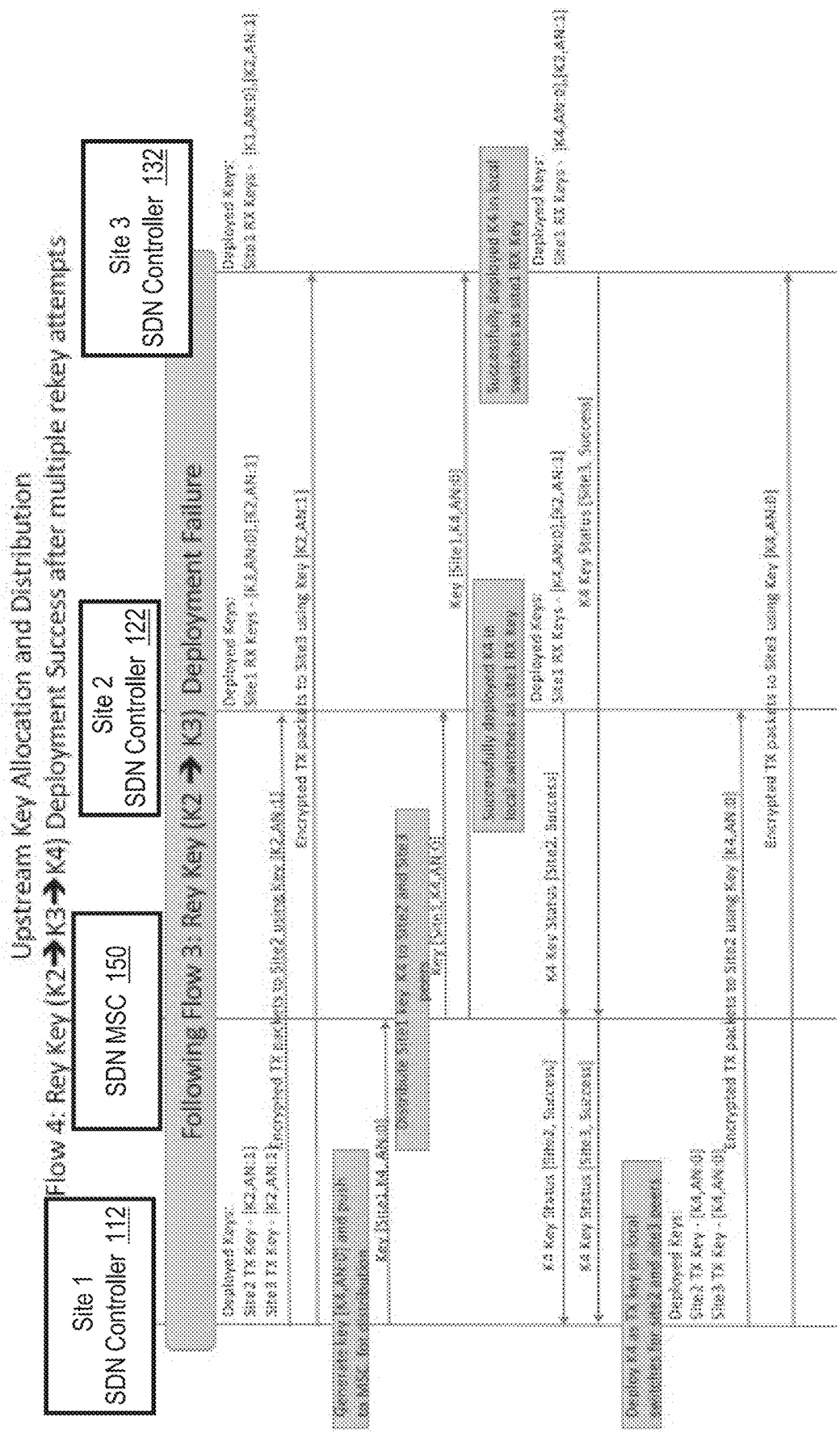
FIG. 5D depicts the successful deployment of new key K4 with AN=0 after multiple re-key attempts.

FIG. 5D depicts the successful deployment of new key K4 with AN=0 after multiple re-key attempts. The flow depicted in FIG. 5D starts where the flow of FIG. 5C ended, with Site 1 using key K2, with AN=1, to encrypt packets sent to Site 2 and Site 3. Sites 2 and 3 each have two deployed keys. Site 2 has key K3, with AN=0, and key K2, with AN=1, while Site 3 has key K1, with AN=0, and key K2, with AN=1. The new key K4 with AN=0 is successfully deployed at both Site 2 and Site 3. Since AN=0 for the new key K4, new key K4 replaces key K3 at Site 2 and key K1 at Site 3. After the successful deployment of new key K4, both Site 2 and Site 3 have the same deployed keys: K4, with AN=0, and key K2, with AN=1. The upstream device at Site 1 encrypts subsequent VXLAN packets using key K4 and includes the SCI and AN=0 in the MACsec header of encrypted packets to enable the downstream devices at Site 2 and Site 3, e.g., spine switch Spine 2 in spine switches 122, 132, respectively, to properly select key K4 as the decryption key to decrypt the encrypted VXLAN payloads.

Figure 5E:
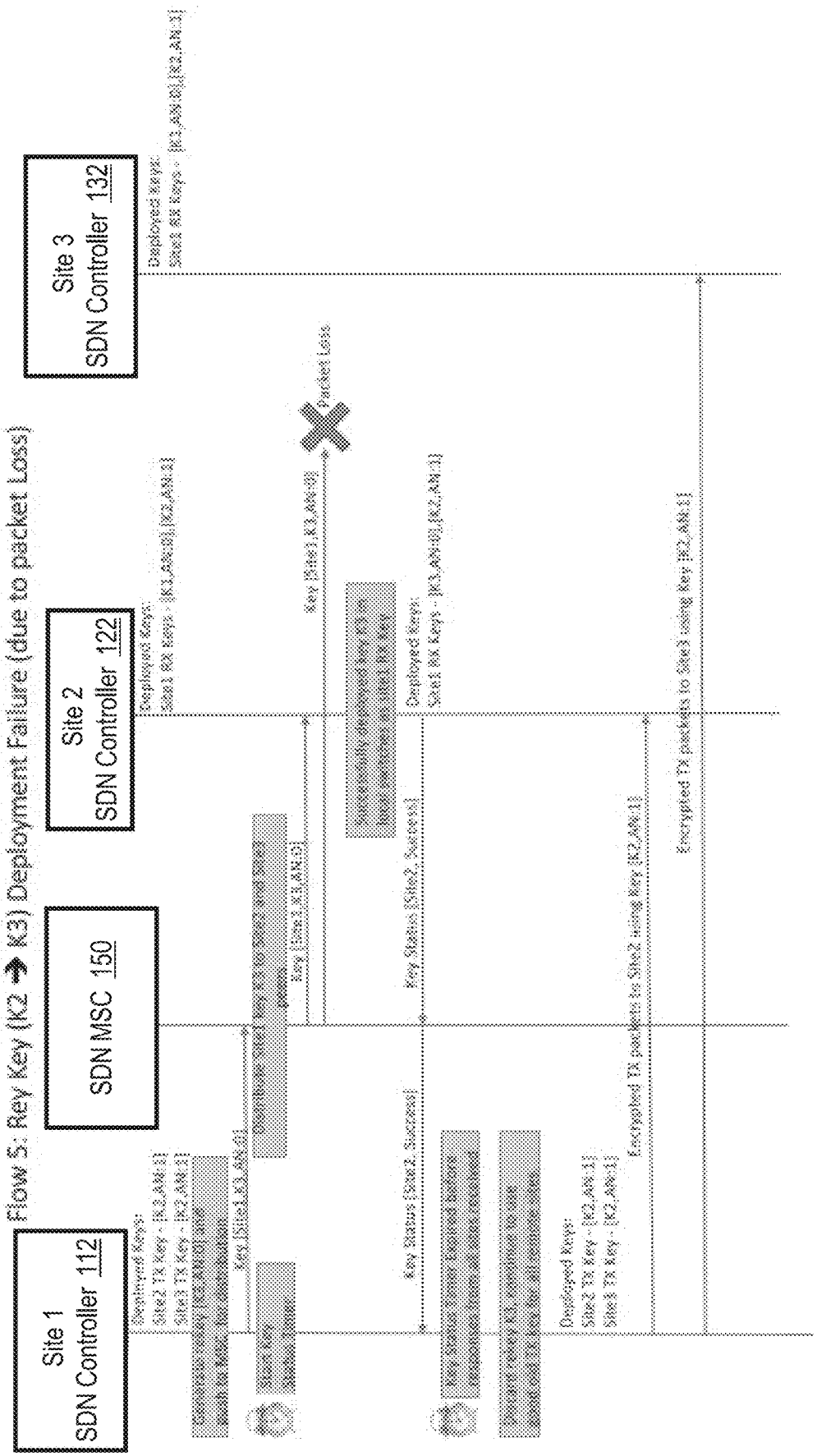
FIG. 5E depicts the unsuccessful re-keying of key K2 to key K3 because of a timeout.

FIG. 5E depicts the unsuccessful re-keying of key K2 to key K3 because of a timeout. This example is the same as the example of FIG. 5C, except that in this example Site 1 does not receive the deployment status for key K3 on Site 3 from SDN MSC 150 before expiration of a timer. In this situation, the steps performed are the same as when Site 1 receives a confirmed failure of Site 3 to deploy the new key K3, namely, Site 2 has deployed key K3, with AN=0, and k deployed key K2, with AN=1, while Site 3 has deployed key K1, with AN=0, and deployed key K2, with AN=1. Site 1 continues to use key K2 to encrypt packets sent to both Site 2 and Site 3.

VII. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
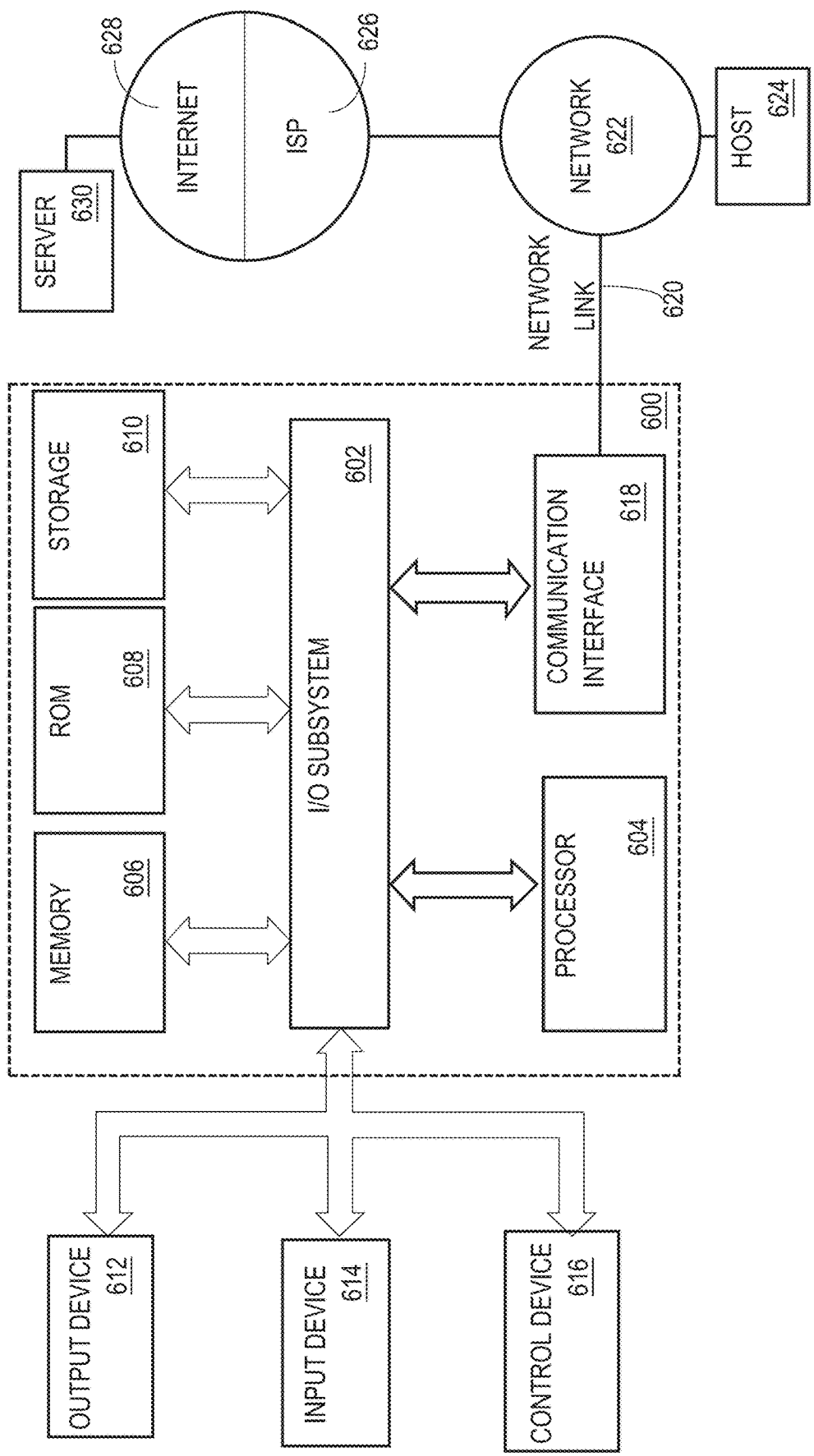
FIG. 6 is a block diagram of a computer system on which embodiments may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A system for distributing keys to a plurality of sites in a multi-site network, comprising:
   a multi-site key distribution controller (MSKDC);
   a first site of a multi-site network comprising a first local key management node;
   a second site of the multi-site network comprising a second local key management node, wherein each of the first and second local key management nodes are operative to establish secure connections with the MSKDC;
   the MSKDC being configured to coordinate key distribution between sites of the multi-site network by:
   receiving, from the first local key management node of the first site of the multi-site network, a request to distribute key material to the second site of the multi-site network, wherein the request includes a security channel identifier value associated with at least the first site; and
   sending, to the second local key management node of the second site, the key material based on the security channel identifier;
   wherein:
   the first local key management node is operative to provide an encryption key based at least in part on the key material to one or more network devices at the first site;
   the encryption key is used by the one or more network devices at the first site to encrypt packets sent from the first site;
   the second local key management node is operative to provide the encryption key based at least in part on the key material to one or more network devices at the second site; and
   the encryption key is used by the one or more network devices at the second site to decrypt encrypted packets sent from the first site.

2. The system of claim 1, wherein the encryption key is a shared symmetric key unique to a combination of the first site and the second site.

3. The system of claim 1, wherein the security channel identifier is associated with the first site and the second site.

4. The system of claim 1, wherein the MSKDC is further configured to coordinate key distribution between sites of multi-site network by:
   receiving, at the MSKDC and from the second site, an acknowledgment that the key material was received at the second site; and
   sending, from the MSKDC and to the first site, a confirmation that the key material was received at the second site.

5. The system of claim 1, wherein the key material further comprises an Association Number (AN).

6. The system of claim 5, wherein the one or more network devices at the second network site are operative to identify the encryption used to decrypt the packets based at least in part on the AN.

7. The system of claim 1, wherein the one or more network devices at the second network site are operative to:
receive an encrypted packet having a Media Access Control Security (MACsec) header;
identify the security channel identifier from the MACsec header; and
based at least in part on identifying the security channel identifier from the MACsec header that is associated with the encryption key, using the encryption key to decrypt the packet.

8. The system of claim 1, wherein the encryption key is configured to decrypt encrypted packets sent from a grouping of sites in the multi-site network that includes the first site and the second site.

9. The system of claim 1, wherein the encrypted packets are VXLAN packets.

10. The system of claim 1, wherein the MSKDC and the first and second local key management nodes communicate over a messaging bus.

11. A method for distributing keys to a plurality of sites in a multi-site network, comprising:
coordinating, by a multi-site key distribution controller (MSKDC), distribution between sites of the multi-site network by:
receiving, from a first local key management node of a first site of the multi-site network, a request to distribute key material to a second site of the multi-site network, wherein the request includes a security channel identifier value associated with at least the first site;
sending, to a second local key management node of the second site, the key material based on the security channel identifier;
wherein each of the first and second local key management nodes are operative to establish secure connections with the MSKDC;
wherein the first local key management node is operative to provide an encryption key based at least in part on the key material to one or more network devices at the first site;
wherein the encryption key is used by the one or more network devices at the first site to encrypt packets sent from the first site;
wherein the second local key management node is operative to provide the encryption key based at least in part on the key material to one or more network devices at the second site; and
wherein the encryption key is used by the one or more network devices at the second site to decrypt encrypted packets sent from the first site.

12. The method of claim 11, wherein the encryption key is a shared symmetric key unique to a combination of the first site and the second site.

13. The method of claim 11, wherein the security channel identifier is associated with the first site and the second site.

14. The method of claim 11, wherein the MSKDC is further configured to coordinate key distribution between sites of multi-site network by:
receiving, at the MSKDC and from the second site, an acknowledgment that the key material was received at the second site; and
sending, from the MSKDC and to the first site, a confirmation that the key material was received at the second site.

15. The method of claim 11, wherein the key material further comprises an Association Number (AN).

16. The method of claim 15, wherein the one or more network devices at the second network site are operative to identify the encryption used to decrypt the packets based at least in part on the AN.

17. The method of claim 11, wherein the one or more network devices at the second network site are operative to:
receive an encrypted packet having a Media Access Control Security (MACsec) header;
identify the security channel identifier from the MACsec header; and
based at least in part on identifying the security channel identifier from the MACsec header that is associated with the encryption key, using the encryption key to decrypt the packet.

18. The method of claim 11, wherein the encryption key is configured to decrypt encrypted packets sent from a grouping of sites in the multi-site network that includes the first site and the second site.

19. The method of claim 11, wherein the encrypted packets are VXLAN packets.

20. The method of claim 11, wherein the MSKDC and the first and second local key management nodes communicate over a messaging bus.

* * * * *